UNITED STATES PATENT OFFICE.

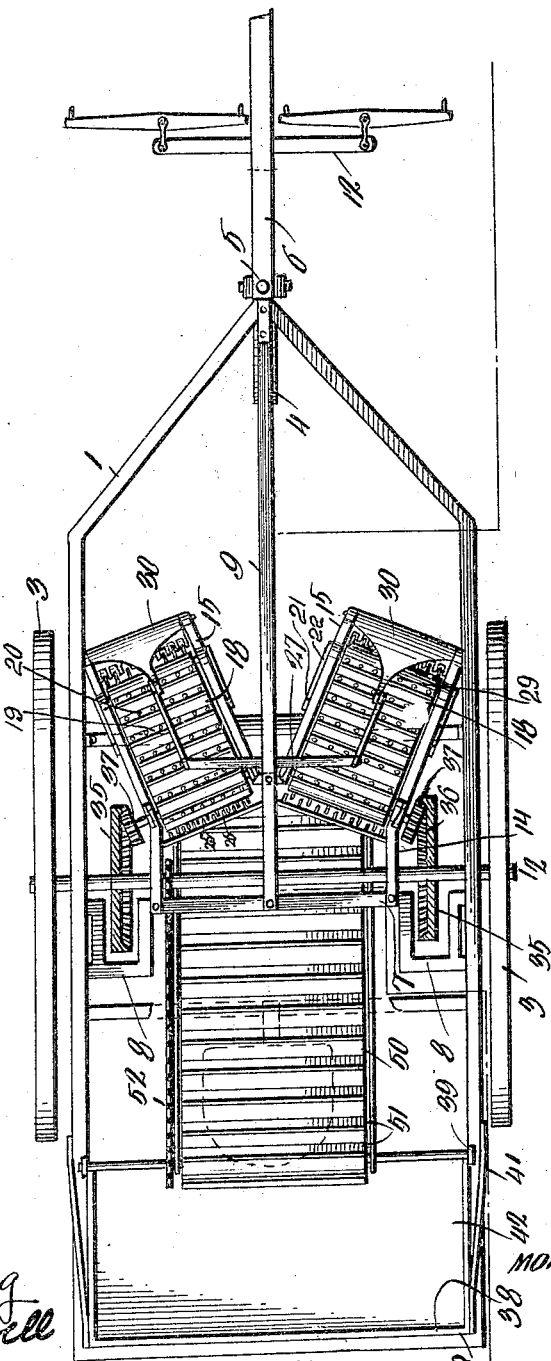

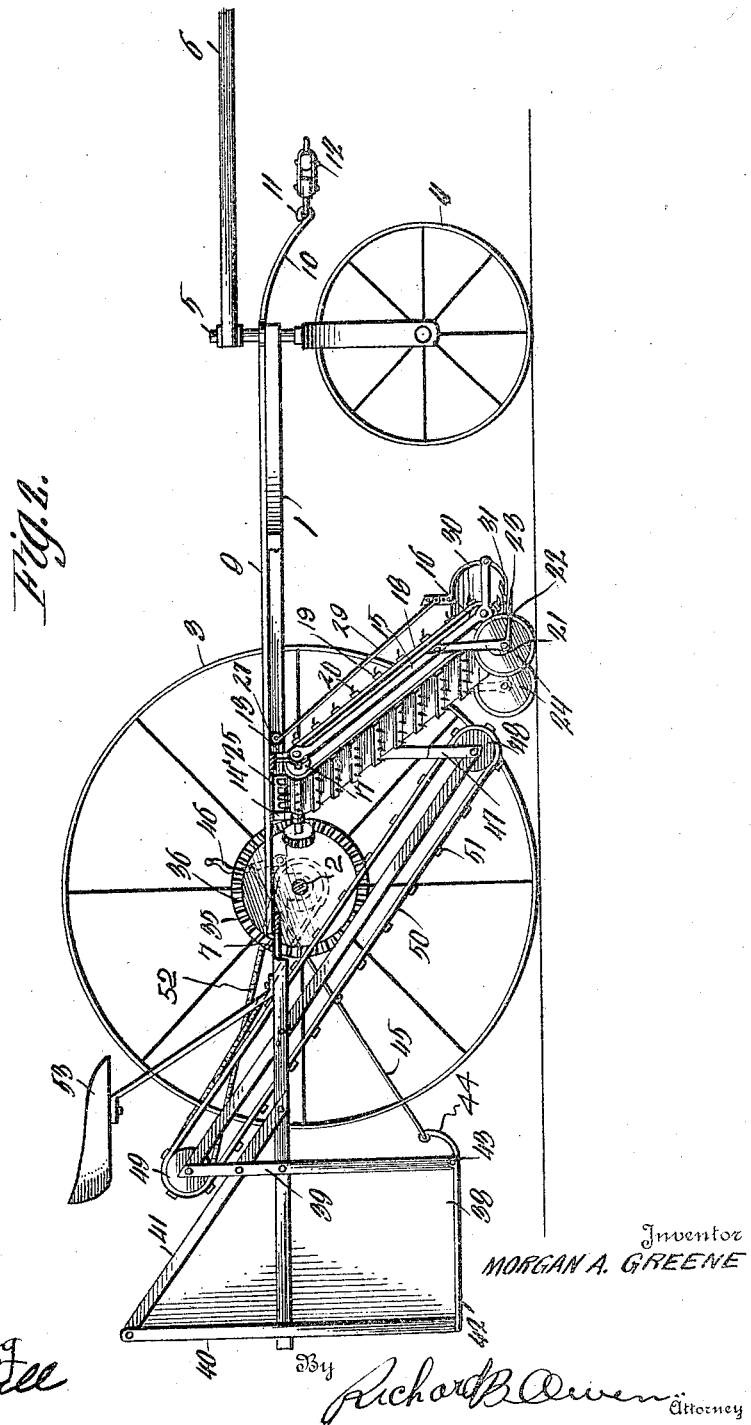

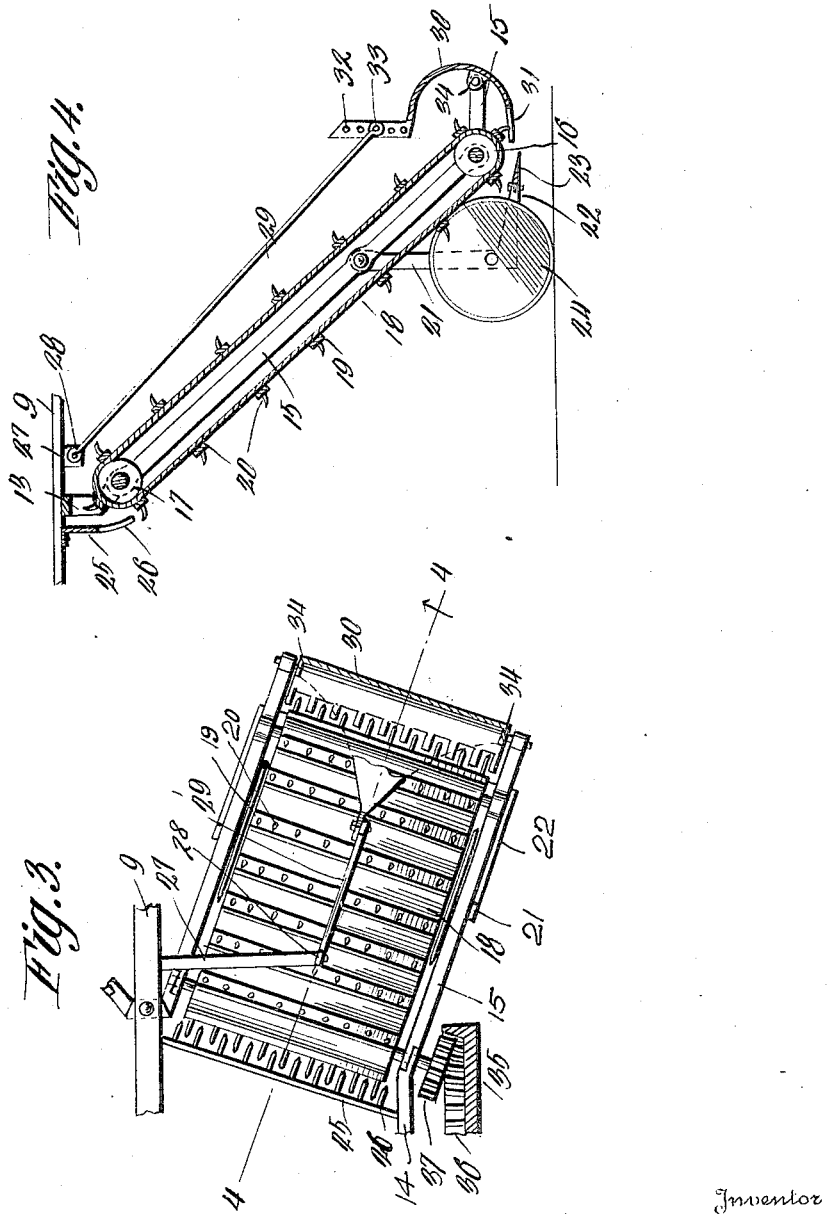

MORGAN A. GREENE, OF RUPERT, IDAHO.

BEET HARVESTER.

1,411,015.

Specification of Letters Patent.  Patented Mar. 28, 1922.

Application filed February 27, 1920. Serial No. 361,857.

*To all whom it may concern:*

Be it known that I, MORGAN A. GREENE, a citizen of the United States, residing at Rupert, in the county of Minidoka and State of Idaho, have invented certain new and useful Improvements in a Beet Harvester, of which the following is a specification.

My invention relates to new and useful improvements in a beet harvester and more particularly to a beet topper, picker, and conveyor.

The principal object of the invention is the provision of a device of this character which is portable and which will top the beets as it progresses over the ground and pick and convey the tops to a receptacle where they are deposited until it is desired to dump in a pile.

Another object of the invention consists in a plurality of toppers whereby a plurality of rows of beets may be topped at the same time.

A further object of the invention consists in the novel form of gauge for limiting the amount of tops cut from each beet.

With these and other objects in view my invention consists in the novel details of construction and arrangement of parts which will be more clearly understood from the following specification and drawings in which—

Figure 1 is a top plan.

Figure 2 is a side elevation with parts broken away.

Figure 3 is a top plan of one of the picker conveyors, and

Figure 4 is a longitudinal vertical section on the line 4—4 of Figure 3 looking in the direction of the arrow.

In the drawings the numeral 1 indicates the frame of the machine having the axle 2 extending transversely thereof, intermediate the ends. Wheels 3 are mounted upon the ends of the axle 2 and act as the rear wheels of the machine. The front guide wheel is indicated at 4 and is provided with an upwardly extending spindle 5 which passes through an opening in the forward end of the frame 1. A tongue 6 is secured to the spindle 5, adjacent the upper end, and the draft animals or a tractor may be secured to this tongue for moving the machine as desired.

A brace bar 7 is secured transversely of the frame 1, in the rear of the axle 2, and is provided with the offset portions 8 for a purpose to be later described. A bar 9 is secured to the center of the bar 7 and extends longitudinally towards the forward end of the machine. This bar 9 is provided with an opening through which the spindle 5 passes and the forward end of the bar is bent downwardly as indicated at 10 as more particularly illustrated in Figure 2 of the drawings. An eye 11 is formed on the forward end of the downwardly bent portion 10 and a doubletree 12 is secured to this eye.

Downwardly extending lugs 13 are formed on the underside of the bar 9 and forwardly extending arms 14 are secured to the transverse bar 7 and are provided with downwardly extending lugs 14'. Frames 15 are pivotally mounted between the lugs 13 and 14' and I will hereafter term these frames the picker frames. As illustrated more particularly in Figure 1 of the drawings there are two of these picker frames and they extend at an angle to form a substantially V-shaped space therebetween. A roller 16 is rotatably mounted in the lower end of each of the frames 15 and a similar roller 17 is rotatably mounted in the upper end of each frame. An endless belt 18 passes around the rollers 16 and 17 and is provided with the transversely extending slats 19 having the prongs 20 on the outer faces thereof. These prongs 20 are preferably of the shape illustrated more particularly in Figure 4 of the drawings.

Arms 21 are secured to each side of the frame 15 and have right angled extensions 22 terminating in a knife edge 23. These right angled extensions 22 and knife edge 23 will be spaced from the ground as indicated more particularly in Figures 2 and 4 of the drawings. Disks 24 are rotatably connected to the downwardly extending arms 21 for a purpose to be later described. Angle iron strips 25 are secured to the bar 9 and arm 14, at the upper end of the conveyors 18, and are provided with a plurality of teeth 26 through which the prongs 20 are adapted to pass. The purpose of these teeth will be presently described.

A bar 27 is secured to the bar 9 and extends at right angles thereto as more particularly illustrated in Figure 1 of the drawings. This bar 27 is provided on the underside with lugs 28 to which the upper ends of bars 29 are pivotally connected. A gauge 30 is secured to the opposite end of the bars 29 and these gauges are curved as indicated more particularly in Figure 4 of the drawings with their lower edges pointing towards the lower end of the picker frame 15. The lower end of the gauge is provided with a plurality of spaced teeth 31 through which the prongs 20 are adapted to pass. The gauge is also provided with a plurality of openings 32 adapted to receive a bolt 33. The gauges 30 are provided on each side with a lug 34 to receive pins or other suitable fastening means whereby the gauges are hingedly connected to the lower ends of the frame 15. By adjusting the bolt 33 in the different openings 32 the gauge will be swung upon the pivot point and adjusted with relation to the knife edge 23.

Disks 35 are secured to the shaft 2, adjacent each end thereof, and operate in the offset portions 8 of the bar 7. These plates or disks are provided with the internal gear teeth 36 which are adapted to mesh with gear wheels 37 secured to the shaft carrying the upper roller 17 of the picker elevator. Therefore as the wheel 3 rotates the shaft 2 will be rotated and thereby rotate the plates 35 and through the teeth thereof the gears 37 and roller 17. This will operate the endless belt 18 over the rollers for a purpose to be later described.

A receptacle 38 is supported in the rear end of the frame 1 and is provided with the forward upstanding arms 39 and the rear upstanding arms 40. A bar 41 connects the upwardly extending arms 39 and 40 and is also secured to the frame 1 as more particularly illustrated in Figure 2 of the drawings. The receptacle 38 is provided with the bottom 42 which is pivotally connected at 43 and provided with the upwardly extending arm 44. A rod 45 is connected to the upwardly extending arm 44 and the opposite end is connected to a foot lever 46 pivotally connected to the frame 1.

Downwardly extending bars or arms 47 are secured to the frame 1 and a roller 48 is rotatably mounted between these downwardly extending bars or arms. A roller 49 is rotatably connected to or carried by the upwardly extending members 39 of the receptacle and an endless belt or conveyor 50 passes around the rollers 48 and 49. This endless belt or conveyor is provided with transversely extending slats 51 as shown more particularly in Figure 2 of the drawings. A gear wheel is secured to the axle 2 and to the shaft supporting the roller 49 and a chain 52 encircles said gear wheel for operating the conveyor belt 50 when the axle is rotated. As shown the upper or rear end of the conveyor belt 50 extends over the top of the receptacle 38 so that the articles carried by the belt may be dumped into the receptacle.

A seat 53 is supported upon the frame 1 between the axle 2 and receptacle 38 as is more particularly shown in Figure 2 of the drawings.

From the above detailed description it is thought that the operation will be clearly understood. If draft animals are to be used for conveying the harvester they will be connected to the tongue 6 and doubletree 12 in the usual manner. As the machine is drawn over the ground the beets will be topped and said portions which are cut off will be picked up and conveyed to a receptacle where they will be deposited until it is desired to dump them in a pile. The gauges 30 are adjusted to the proper position with relation to the knife edge 23 so that the desired amount will be cut from the top of each beet. It will be understood that the gauges 30 may be adjusted to adapt the several parts of my invention to beets which are extending from the ground any desired distance. The knife edges 23 will cut a portion on the top of the beet and the endless belt or conveyor 18 will rotate so that the prongs 20 will pass through the teeth 31 of the gauge. The prongs or teeth 20 will engage in the cut off portions of the beets and carry them upwardly until they are disengaged from the prongs by the teeth 26. When disengaged the tops will fall upon the conveyor belt 50 and be conveyed and dropped into the receptacle 38. When the receptacle has been filled to the desired amount, the foot lever 46 is operated to swing the bottom 42 on the pivot 43. This will allow the tops to drop upon the ground in a pile. The several conveyors are operated by the rotation of the ground wheels 3. These ground wheels will operate the disks 35 having the teeth 36, which in turn will rotate the gear wheels 37 and from them the conveyor belts 18. At the same time the rotation of the chain 52 will operate the conveyor belt 50 to convey the tops upwardly. As stated in the objects of the invention the gauges 30 may be adjusted so as to top the predetermined amount from each beet. The blades or disks 24 are used for cutting any tops which have dropped upon the ground. This prevents the tops from being enmeshed in the operating parts of the machine.

The foregoing description and the accompanying drawings have reference to what might be considered the approved, or preferred, form of my invention. I desire it to be understood that I may make such changes in construction, combination and arrangement of parts, materials, dimensions, etc. as may prove expedient and fall within the scope of the appended claims.

Having fully described my invention what I claim as new and desire to secure by Letters Patent is:—

1. A beet harvester comprising a frame, wheels supported on the frame, a cutting blade secured to the frame, a conveyor having its forward end adjacent the cutting blade, prongs carried on the conveyor, a gauge pivotally connected adjacent the forward end of the conveyor, teeth formed on the gauge and adapted to have the prongs of the conveyor passed therethrough, and means for adjusting the gauge.

2. A beet harvester comprising a frame, a cutting blade secured to the frame, a conveyor having its forward end adjacent the cutting blade, prongs carried on the conveyor, a gauge including a curved body portion having teeth formed on its lower end pivotally connected adjacent the forward end of the conveyor, said gauge provided with a plurality of openings upon its upper end, a rod pivotally connected to the frame and having an eye in one end and a bolt adapted to pass through the eye in the rod and in the opening in the gauge so as to adjust same in the manner described.

In testimony whereof I affix my signature in presence of two witnesses.

MORGAN A. GREENE.

Witnesses:
ALBERT H. LEE,
OSCAR F. ALLEN.